No. 854,476. PATENTED MAY 21, 1907.
W. C. FOGLE.
MEASURING DEVICE.
APPLICATION FILED JUNE 30, 1905.
2 SHEETS—SHEET 1.
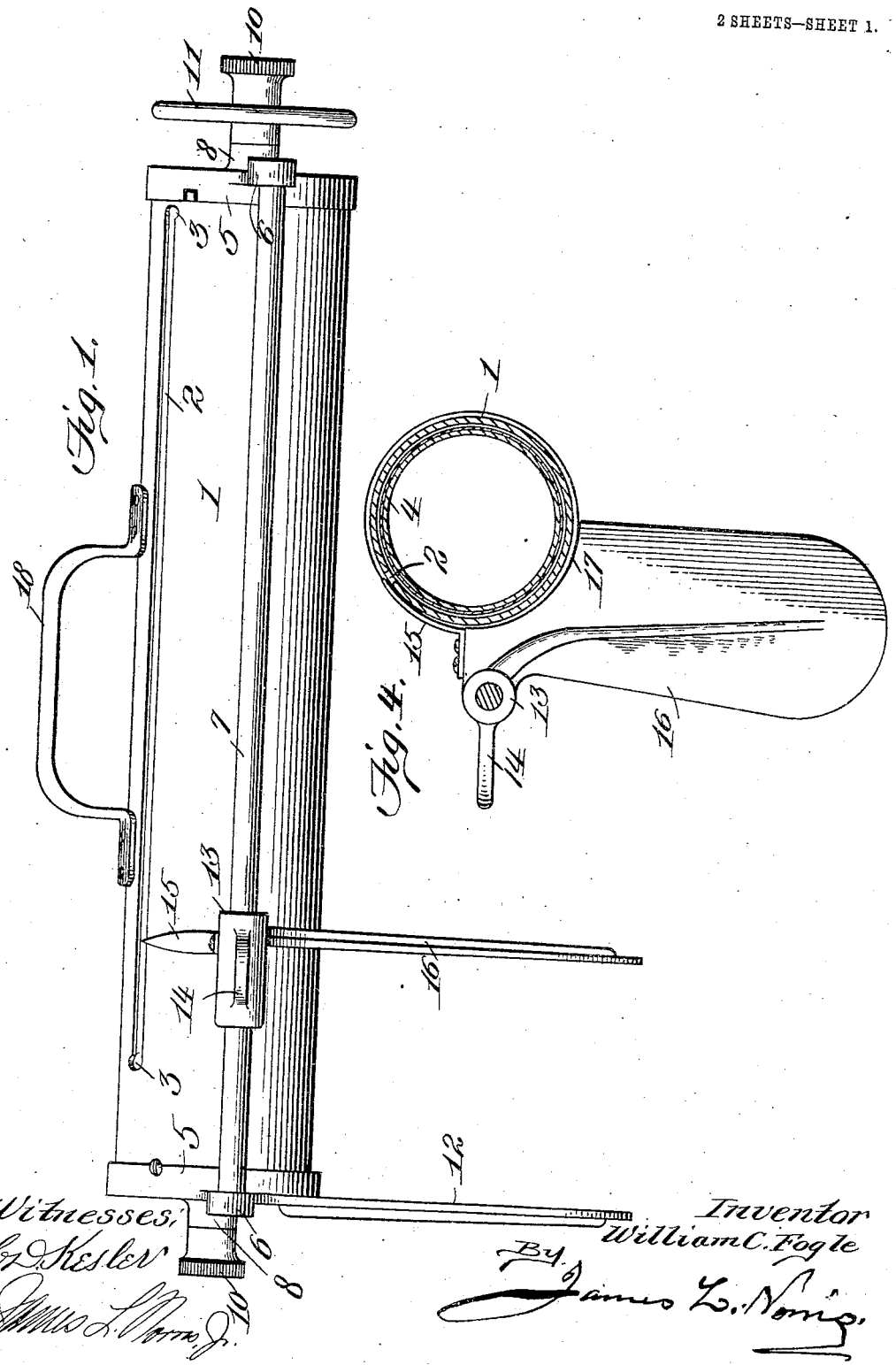
Witnesses,
C. Kesler
James L. Norris, Jr.
Inventor
William C. Fogle
By
James L. Norris.
Atty No. 854,476. PATENTED MAY 21, 1907.
W. C. FOGLE.
MEASURING DEVICE.
APPLICATION FILED JUNE 30, 1905.
2 SHEETS—SHEET 2.
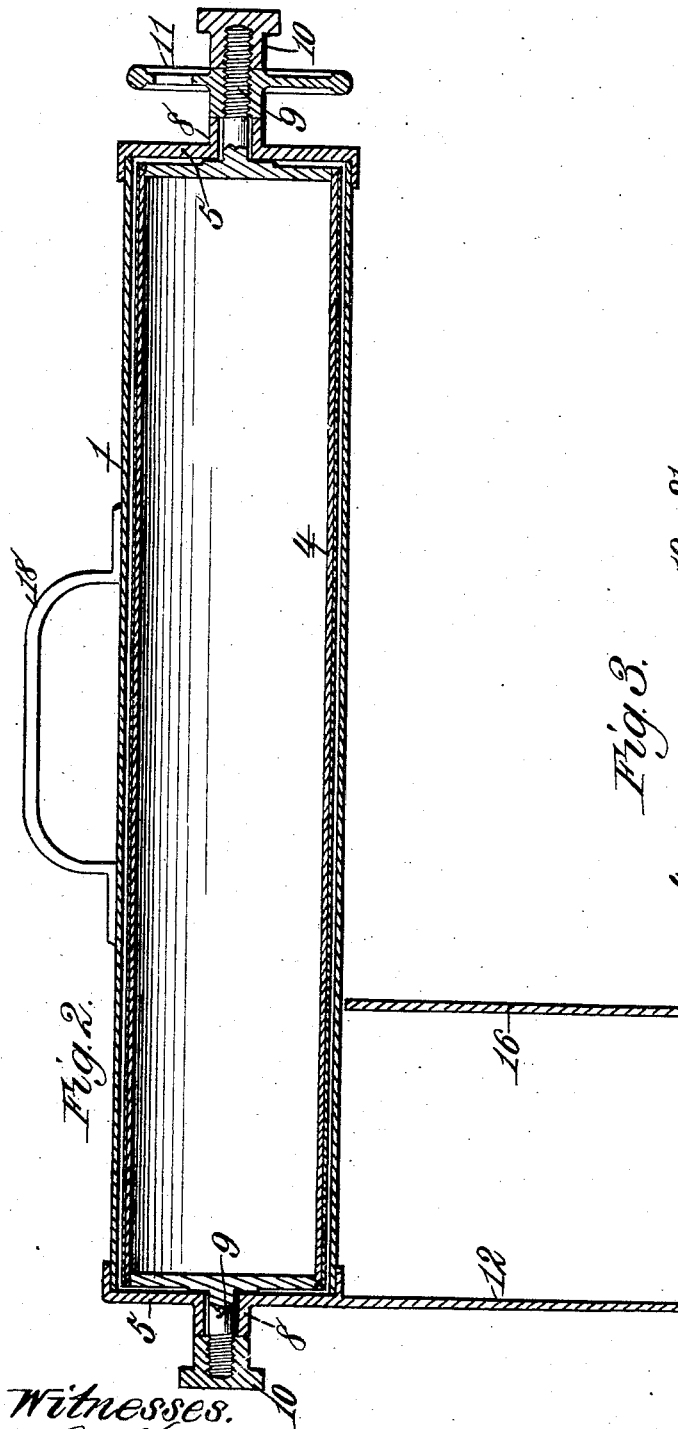
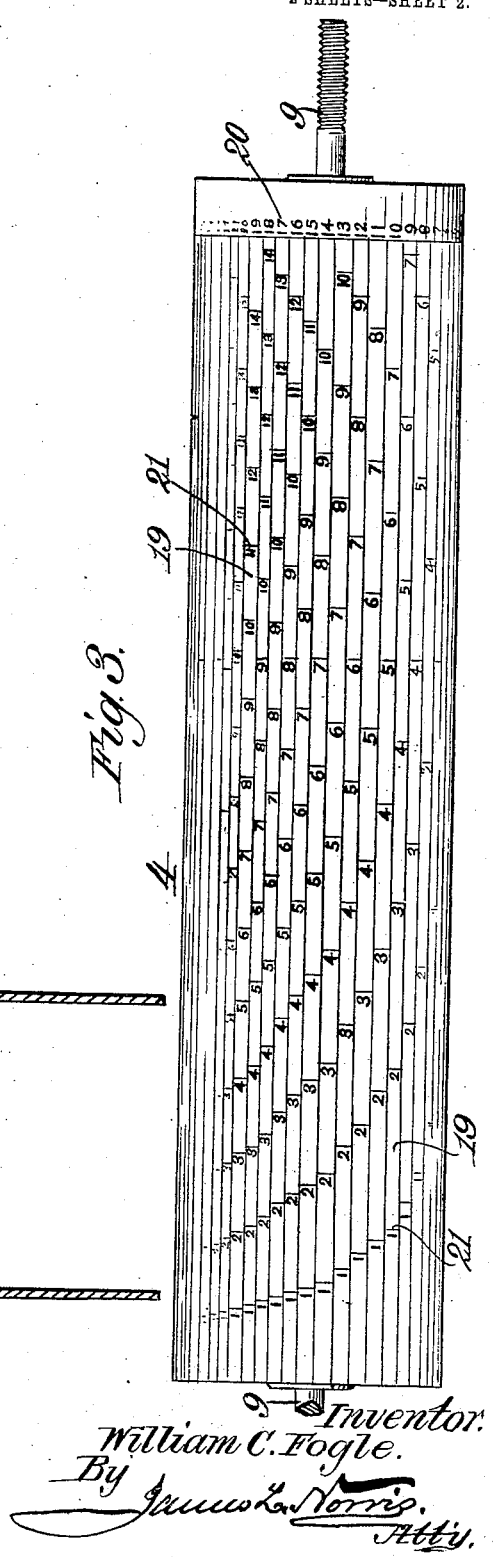
Witnesses.
Inventor.
William C. Fogle.
By James L. Norris.
Atty.

UNITED STATES PATENT OFFICE.

WILLIAM C. FOGLE, OF WILLIAMSBURG, KANSAS, ASSIGNOR, BY DIRECT AND MESNE ASSIGNMENTS, TO ALFRED E. PUTNAM, OF MILAN, MICHIGAN.

MEASURING DEVICE.

No. 854,476.    Specification of Letters Patent.    Patented May 21, 1907.

Application filed June 30, 1905. Serial No. 267,862.

*To all whom it may concern:*

Be it known that I, WILLIAM C. FOGLE, a citizen of the United States, residing at Williamsburg, in the county of Franklin and State of Kansas, have invented new and useful Improvements in Measuring Devices, of which the following is a specification.

This invention relates to measuring machines or devices for application to rolled or wrapped cloths or other material to instantly obtain the yardage, when the number of folds are known, without requiring a measurement in inches or other fractional units of any kind or resorting to a specific measurement of a portion of a fold containing less than a yard.

The machine or device embodies a table or particular scale means divided successively and proportionately into a number of spaces so that a roll or bolt of cloth containing two yards and a fraction may be as readily measured as one containing twenty or more yards. The scale from which the computation or knowledge as to quantity of goods contained in a roll or bolt measured is carried by a rotatable cylinder longitudinally divided into spaces of regular widths throughout the circumferential area of the cylinder, and said spaces subdivided in accordance with the number of yards which they are intended to individually designate, and coöperating with these spaces is a longitudinally movable indicator having an arm or projection movable therewith and operative in relation to a similar fixed arm or projection held at one end of the machine or device, both arms or projections being in planes at right angles to the cylinder carrying the scale.

The accompanying drawings illustrate a preferred embodiment of the invention, and therein, Figure 1 is a side elevation of an improved measuring machine or device. Fig. 2 is a central longitudinal vertical section of the same. Fig. 3 is a detail view in elevation of the scale cylinder, illustrating the manner of dividing the latter and said Fig. 3 being on a larger scale than Figs. 1 and 2. Fig. 4 is a cross section of the machine.

Similar numerals of reference are employed to indicate corresponding parts in the several views.

The numeral 1 designates an inclosing cylinder or casing, having a longitudinal slot or opening 2 therein, terminating in apertures 3 to expose certain numerals on a measuring cylinder 4 at either end of the latter, and which will be more fully hereinafter specified. The inclosing cylinder or casing 1 is provided with opposite heads 5, having lugs or ears 6 projecting from the peripheries thereof and formed with suitable recesses in the inner sides to receive a guide rod 7. The heads 5 also have central bearings 8, and therethrough rotatably project stub shafts or spindle terminals 9 of the measuring or scale cylinder 4, the stub shafts or spindle terminals being screw threaded to receive cap nuts or analogous devices 10 to hold the cylinder 4 accurately in position within the inclosing cylinder or casing 1.

Between one of the bearings 8 and cap nuts 10, a hand wheel or similar device 11 is interposed and operative to turn the cylinder 4 within the inclosing cylinder or casing 1, said hand wheel being preferably located at the right end or extremity of the machine. Fixed to the head 5 of the inclosing cylinder 1 at the left end of the machine, and in the present instance forming an integral part of the lug or ear 6, is an arm 12, having an inner smooth side, which is accurately disposed in a plane at right angles to the cylinder 1.

On the rod 7 a slide 13 is mounted, and preferably consists of a sleeve of suitable thickness, having an outwardly projecting finger piece 14, and an indicator or pointer 15, which extends over a portion of the casing to coöperate with the slot 2. The slide also includes in its organization an arm 16, having an inner smooth side and disposed in a plane parallel with the fixed arm 12, the inner end of the arm 16 having a concaved recess or seat 17 to permit it to move freely over the inclosing cylinder or casing 1. Both arms 12 and 16 are held in planes at right angles to the inclosing cylinder or casing 1. For convenience in transporting or applying the measuring machine or device a handle 18 is secured to the upper portion thereof.

The cylinder 4 has defined thereon a measuring scale with which the indicator or pointer 15 coöperates. This scale may be carried either by a sheet of suitable material wound around the cylinder 4 and secured to the latter, or, in some instances, it is obvious that said scale may be directly formed on the cylinder. In either arrangement the scale comprises a plurality of longitudinal spaces 19, extending from end to end of the cylinder 4, and fully around the latter in equal spaced relation. At either end of the cylinder, in the present instance at the right, is a circumferential column of figures 20, being arranged from "1 to 100" to designate the number of folds in the roll or bolt of cloth to be measured. These fold indicating figures 20 are exposable through one of the apertures 3 with which the slot 2 communicates, and the spaces 19 are readily observable through the said slot. Each of the spaces 19 is subdivided by lines 21 at varying distances apart in the several spaces, the proportion of the distance apart of these lines 21 in the successive longitudinal spaces 19 being predetermined in accordance with the number of folds designated at the ends of the several spaces 19 by the figures 20. The greater the number of folds the several succeeding spaces 19 represent, the greater will be the subdivisions by means of the lines 21 of the said spaces. The longitudinal space 19 having the fold indicating figure "9" at the head thereof or on the margin of the cylinder 4 in practice, is divided into spaces precisely two inches apart, the first division mark 21 will be exactly two inches from the left margin of the cylinder and indicating one yard and so marked, and the next division mark 21 will be two inches farther to the right and marked to indicate two yards, and so on to the right margin of the cylinder. In the space 19, having the head or marginal numeral "18", the yard divisions, as indicated by the lines 21, will be just one inch apart, and this decrease in distance apart of the lines or yard division marks 21 will be regularly effected in the succeeding spaces having higher indicating figures at the heads thereof or on the margin of the scale.

Fig. 3 of the drawing shows the regularity of the length of divisions 21, just referred to, and the same proportions will be carried out in all the divisions.

The exact distance mentioned with respect to the divisions of spaces "9" and "18" are not illustrated, as the scale would be enlarged to such an extent as to render it practically impossible to show the scale in full length. By the use of this scale, the difference in the lengths of folds of a roll or bolt is approximately compensated for, or with sufficient accuracy to enable an operator or salesman to ascertain substantially the yards and fractions of a yard in each roll and without requiring a complete unrolling of the goods and an exact measurement by means of a yard stick or other ordinary linear measuring device.

The scale or table just described is calculated or determined from the ordinary widths of bolts or rolls of cloth and the lengths of the several windings or folds with respect to a regular decrease in width and length as the windings or folds approach the center of the rolls or bolts.

In the use of the device, the number of folds in the wound piece of goods being first ascertained, the measuring or inner cylinder 4 is turned until the space number on the margin of the cylinder corresponding to such number of folds appears through one of the apertures 3. The machine, device, or instrument is then set across the piece of goods so that the stationary or fixed arm 12 at the left will fit snugly against the left edge of the piece of goods. The slide 13 is then operated or moved longitudinally over the rod 7 until the arm 16 carried thereby is brought snugly to bear against the opposite edge of the piece of the goods, and the indicator or pointer 15 having followed along the slot or opening 2 will stop at the figure on the inner cylinder or scale of the latter representing the number of yards, or if the pointer stops at the right of a figure any fraction of a yard may be readily ascertained by the distance between the indicator or pointer and the next figure. All the yard divisions of the several spaces 19 designated by the division lines 21 have yard representing numerals applied thereto, as shown, and the operator can readily detect, through the medium of the eye, the fraction of a yard that may be shown by the position of the indicator or pointer 15 with respect to the next yard designating figure in the same space.

From the foregoing it will be seen that no computation is necessary in the use of the measuring machine or instrument, and the proportions of the scale on the cylinder 4 will be pursued with such mathematical nicety that the result given by the operation of the machine may be depended upon with accuracy. Consequently, the improved machine or instrument will be found exceptionally convenient in expeditiously ascertaining the quantity of cloth or goods contained in a folded piece with material advantages in taking stock or keeping an accurate account of the number of yards of each kind of goods in stock. The improved machine is also advantageous for use in making either wholesale or retail sales in determining the number of yards in wound or folded pieces of goods.

The cylinder 4 is fully protected and shielded by the inclosing casing 1, and it is preferred that the said cylinder 4 have sufficient rigidity to resist variation of the true cylindrical surface thereof that might ensue from shocks or blows delivered thereto, or an intense contraction and expansion. While it is preferred that the cylinder 4 be formed from metal of a suitable nature, it is not absolutely essential that such material be used. The table of measurement carried by the cylinder 4 may also be varied within the scope of the same principle, and in accordance with the size or general dimensions of the machine or instrument.

Having thus described the invention, what is claimed, is:

1. In a measuring machine or instrument of the class set forth, an inclosing casing having a slot therethrough, a cylindrical scale rotatably mounted in the said casing and provided with longitudinal lines forming regular spaces having end or head fold designating numerals consecutively arranged around the scale, the spaces being subdivided in planes at right angles to said lines to indicate the number of yards and fractions of yards, the sub divisions being varied as to their distances apart in the several spaces and proportionate to the number of folds which the several longitudinal spaces represent, and devices for engaging the opposite edges of the folded cloth to be measured, one of said devices being fixed to one end of the casing and the other movable longitudinally with respect to the cylinder and scale and toward and away from the other device.

2. In a measuring machine or instrument of the class described, a rotatable cylinder having thereon a scale divided longitudinally and circumferentially to represent the number of folds in a piece of goods and the yards or fractions of the latter in the specific number of folds, an inclosing casing having a longitudinal slot therein through which the cylinder is exposed, an arm fixed to one extremity of the casing, and an arm slidable longitudinally over the casing and provided with an indicator which coöperates with the slot.

3. In a measuring machine or instrument of the class described, a rotatable cylinder having a measuring scale thereon consisting of longitudinal spaces successively representing different numbers of folds of cloth, and subdivided to designate yards and fractions of yards, the fold spaces having head or marginal numerals at one end of the cylinder, an inclosing casing having a longitudinal slot and a terminal aperture to expose the spaces, subdivisions, and head numerals of the spaces, an arm fixed to one extremity of the casing, and a similar arm slidable longitudinally over the casing and having an indicator to coöperate with the slot.

4. In a measuring machine or instrument of the class described, the combination of a rotatable cylinder having a scale thereon longitudinally divided into spaces representing different numbers of folds, the spaces having head numerals increasing regularly circumferentially around the cylinder, the several spaces being subdivided to designate yards and fractions of a yard, the subdivisions in the several spaces increasing in number proportionately to the increase of the number of folds represented by the successive spaces, and means longitudinally movable with respect to the cylinder and applicable to the folds of cloth to be measured.

5. In a measuring machine or instrument of the class described, the combination of a rotatable cylinder having a scale thereon longitudinally divided into spaces continuing regularly throughout the circumference of the cylinder and having numerals successively increasing regularly to indicate the number of folds in various sizes of wound goods or cloth, the spaces being subdivided to designate yards and fractions of a yard, the subdivisions decreasing in extent proportionately to the increase of the number of folds represented by the successive longitudinal spaces, and devices for engaging the opposite edges of a folded piece of goods or cloth, one of the said devices being movable longitudinally of the cylinder and having an indicator to coöperate with the scale.

6. In a computing caliper, the combination with a casing and a stationary and an adjustable arm, of a chart containing a plurality of parallelly arranged scales, said chart being adjustable to register any desired scale in reading proximity to said adjustable arm.

7. In a computing caliper, the combination with a stationary and an adjustable arm, of a casing to which said arms are secured, a chart having a plurality of scales thereon parallel to each other and extending longitudinally of said casing, said chart being adjustable laterally of said casing to bring any of said scales into position for reading in connection with said movable arm.

8. A computing caliper comprising a fixed and an adjustable arm, a hollow casing upon which said arms are mounted, and a chart within said casing adapted for adjustment to bring different portions thereof in position for reading in connection with said movable arm.

9. A computing caliper comprising a stationary and an adjustable arm, a hollow casing upon which said arms are mounted having a slot extending longitudinally thereof, and a chart within said casing adjustable to bring different portions thereof in registration with said slot.

In testimony whereof I have hereunto set my hand in presence of two subscribing witnesses.

WILLIAM C. FOGLE.

Witnesses:
HARRY McWILLIAMS,
A. A. MUNGER.